United States Patent
Galles et al.

(10) Patent No.: US 7,784,700 B2
(45) Date of Patent: Aug. 31, 2010

(54) DE-BOWING PERSONALIZED CARDS

(75) Inventors: Donald Galles, Blaine, MN (US); Peter Edward Johnson, Maple Grove, MN (US)

(73) Assignee: DataCard Corporation, Minnetonka, MN (US)

( * ) Notice: Subject to any disclaimer, the term of this patent is extended or adjusted under 35 U.S.C. 154(b) by 966 days.

(21) Appl. No.: 11/557,752

(22) Filed: Nov. 8, 2006

(65) Prior Publication Data

US 2007/0102518 A1 May 10, 2007

Related U.S. Application Data

(60) Provisional application No. 60/735,945, filed on Nov. 10, 2005.

(51) Int. Cl.
*G06K 13/00* (2006.01)
(52) U.S. Cl. .................. 235/492; 235/475
(58) Field of Classification Search .......... 235/475, 235/449, 477, 439, 441, 451, 492, 493, 486, 235/453

See application file for complete search history.

(56) References Cited

U.S. PATENT DOCUMENTS

| 4,825,054 | A | | 4/1989 | Rust et al. | |
|---|---|---|---|---|---|
| 5,266,781 | A | | 11/1993 | Warwick et al. | |
| 5,729,000 | A | * | 3/1998 | Sugimoto | 235/441 |
| 6,250,552 | B1 | * | 6/2001 | Hirasawa | 235/475 |
| 6,659,348 | B2 | * | 12/2003 | Nagata et al. | 235/451 |
| 6,902,107 | B2 | | 6/2005 | Shay et al. | |
| 2001/0017318 | A1 | * | 8/2001 | Nagata et al. | 235/451 |
| 2002/0134516 | A1 | * | 9/2002 | Ashley et al. | 156/540 |
| 2003/0201330 | A1 | * | 10/2003 | Nagata et al. | 235/475 |
| 2007/0102518 | A1 | * | 5/2007 | Galles et al. | 235/439 |

FOREIGN PATENT DOCUMENTS

EP 0514915 11/1992
JP 63-262227 10/1988

OTHER PUBLICATIONS

International Search Report for corresponding International Application No. PCT/US2006/060736.

* cited by examiner

*Primary Examiner*—Thien M Le
(74) *Attorney, Agent, or Firm*—Hamre, Schumann, Mueller & Larson, P.C.

(57) ABSTRACT

An apparatus and method for de-bowing personalized cards which includes a first contact member. The first contact member can be positioned for contacting a personalized card received by the apparatus and for displacing the personalized card against a bow occurring therein. The first contact member contacts and displaces a portion of the personalized card on one side of the personalized card and at an area that is generally centered horizontally and vertically. A second contact member can be supported by the frame for contacting the personalized card on a side opposite the first contact member. The second contact member being arranged and configured to contact an opposite side of the personalized card at a plurality of positions proximate the perimeter of the personalized card. In this manner, the first and second contact members cooperate to bend substantially the entire surface area of the personalized card against the occurring bow.

20 Claims, 7 Drawing Sheets

DE-BOWING PERSONALIZED CARDS

CROSS-REFERENCE TO RELATED APPLICATIONS

The present application claims the benefit of U.S. Provisional Patent Application Ser. No. 60/735,945 entitled "DE-BOWING PERSONALIZED CARDS," filed on Nov. 10, 2005, which is herewith incorporated by reference in its entirety.

FIELD OF THE DISCLOSURE

The technical disclosure herein relates to reducing bowing effects associated with the production of personalized identity documents, for instance plastic cards including financial (e.g. credit and debit) cards, drivers' licenses, national identification cards, and other cards which bear personalized data unique to the card holder and/or which bear other card or document information. Particularly, the technical disclosure herein relates to reducing bowing effects associated with heat lamination and other heat transfer processes which effects may occur during production of such personalized identity documents.

BACKGROUND

Card personalization systems and methods used in producing personalized cards and other personalized identity documents have been employed by institutions that issue such documents. Identity documents, which are often personalized by such systems and methods, include plastic and composite cards, for instance financial (e.g. credit and debit) cards, drivers' licenses, national identification cards, and other cards and documents which are personalized with information unique to the intended document holder.

Card personalization systems and methods can be designed for small scale, individual card personalization and production. In these systems, a single card to be personalized is input into a personalization machine, which typically includes one or two personalization/production capabilities, such as printing and laminating.

For large volume batch production of cards, institutions often utilize systems that employ multiple processing stations or modules to process multiple cards at the same time to reduce the overall per card processing time. Examples of such systems are disclosed by DataCard Corporation of Minneapolis, Minn., in U.S. Pat. Nos. 4,825,054, 5,266,781 and its progeny, and U.S. Pat. No. 6,902,107. Common to each of these types of systems is an input with the ability to hold a relatively large number of cards that are to be personalized/produced, a plurality of personalization/production stations through which each card is directed to undergo a personalization/production operation, and an output that holds the personalized cards. A controller is typically employed to transfer data information and instructions for operating the input, the personalization/production stations, and the output. As with small scale card personalization machines, batch production systems also include printing and laminating capabilities.

Some personalization/production operations in these systems or machines, however, may produce undesired bowing effects in a personalized card. That is, a bend may occur in a personalized card as a result of the personalization/production operations performed on the card. Particularly, this bowing problem can occur as a result of heat lamination and other heat transfer operations that, when performed, may create a bow or bend in a personalized card.

The technical disclosure, as described hereinbelow, can provide a solution for reducing bowing effects resulting from personalized card production, and particularly from such personalization/production operations as heat lamination and other heat transfer processes.

SUMMARY OF THE DISCLOSURE

Generally, the present disclosure provides for reducing bowing in personalized documents. More particularly, the present disclosure provides an apparatus and method of de-bowing personalized cards, such as after a card has undergone heat lamination or other heat transfer operations. The present disclosure may achieve production of personalized cards having improved reliability and performance.

In one embodiment, an apparatus for de-bowing personalized cards comprises a frame that supports a first contact member and one or more second contact members. The first and second contact members cooperate so as to bend a personalized card against a bow occurring therein.

In one embodiment, an apparatus for de-bowing personalized cards comprises a frame supporting a first contact member for contacting a personalized card received by the apparatus and for displacing the personalized card against a bow occurring therein. The first contact member can be positioned so as to contact and displace a portion of the personalized card on one side of the personalized card and at an area that is generally centered horizontally and vertically. One or more second contact members can be supported by the frame for contacting another portion of the personalized card on a side opposite the first contact member. The one or more second contact members being arranged and configured to contact an opposite side of the personalized card, at a plurality of positions proximate the perimeter of the personalized card.

In this manner, the first and second contact members cooperate to contact the personalized card and to substantially bend the entire surface area of the personalized card against the occurring bow along its horizontal axis and vertical axis.

In one embodiment, the first contact member comprises a single pad being movable with respect to the frame. The first contact member may be disposed on the frame so that it may be moved generally between a contact position and a non-contact position. The first contact member is movable toward the personalized card, so as to impart displacement of the personalized card against the bow occurring therein. When the first contact member moves toward the personalized card, the first contact member initiates contact with and displacement of the personalized card at a generally horizontally and vertically centered area of the card.

In one embodiment, the first contact member initiates contact with and displacement of the personalized card on a single point of the card that is horizontally and vertically centered. The first contact member moves along a continuous axis between the contact position and the non-contact position.

In one embodiment, the one or more second contact members is supported by the frame, and may reside outside of a path of the first contact member. The second contact members are arranged and configured to contact the personalized card, when the first contact member moves toward the one or more second contact members and displaces the personalized card. The one or more second contact members contact a side opposite the side the first contact member contacts.

In one embodiment, the one or more second contact members are generally arranged and configured at positions to generally receive and contact four corner positions of the personalized card. In yet another embodiment, the one or more second contact members comprise four contact members arranged at corners which generally correspond to the corners of a personalized card.

In one embodiment, the one or more second contact members are pivotable toward the first contact member when the first contact member moves toward the one or more second contact members.

In yet another embodiment, a method for de-bowing personalized cards includes moving a first contact member toward a personalized card. The first contact member moves toward and contacts the personalized card on one side of the personalized card at a generally horizontally and vertically centered area. The first contact member displaces a portion of the personalized card against a bow occurring therein. The first contact member displaces the portion of the personalized card initiated at the generally horizontally and vertically centered area. The one or more second contact members contacts another portion of the personalized card on a side opposite the first contact member. The one or more second contact members contact an opposite side of the personalized card, when the first contact member displaces the personalized card at a plurality of positions proximate the perimeter. The first contact member and the one or more second contact members cooperate to reduce the bow occurring in the personalized card.

It will also be appreciated that in some embodiments de-bowing occurs immediately after lamination or heating of a personalized card.

The present disclosure may provide advantages such that a bowing effect of a personalized card may be reduced or entirely removed. Particularly, the present disclosure may reduce a bowing effect of a personalized card after the personalized card is subjected to a heat lamination or other heat transfer processes.

These and other various advantages and features of novelty, which characterize the inventive concepts, are pointed out in the following detailed description. For better understanding of the technical disclosure, its advantages, and the objects obtained by its use, reference should also be made to the drawings which form a further part hereof, and to accompanying descriptive matter, in which there are illustrated and described specific examples in accordance with the principles of the inventive concepts.

BRIEF DESCRIPTION OF THE DRAWINGS

Referring now to the drawings in which like reference numbers represent corresponding parts throughout.

DETAILED DESCRIPTION OF THE DISCLOSURE

Figure 1A:
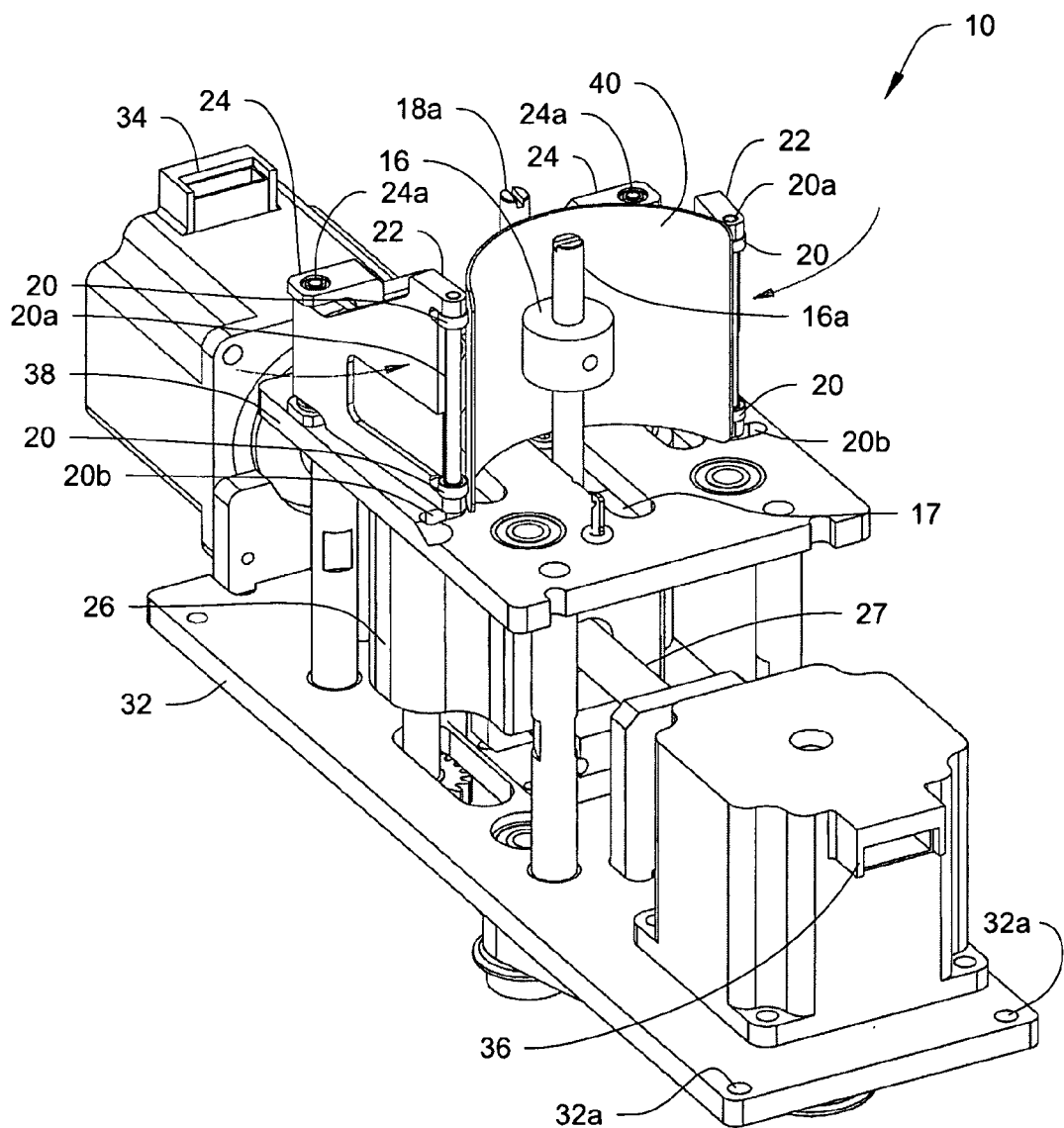
FIG. 1A represents a perspective view of one embodiment of an apparatus for de-bowing personalized cards.
Figure 1B:
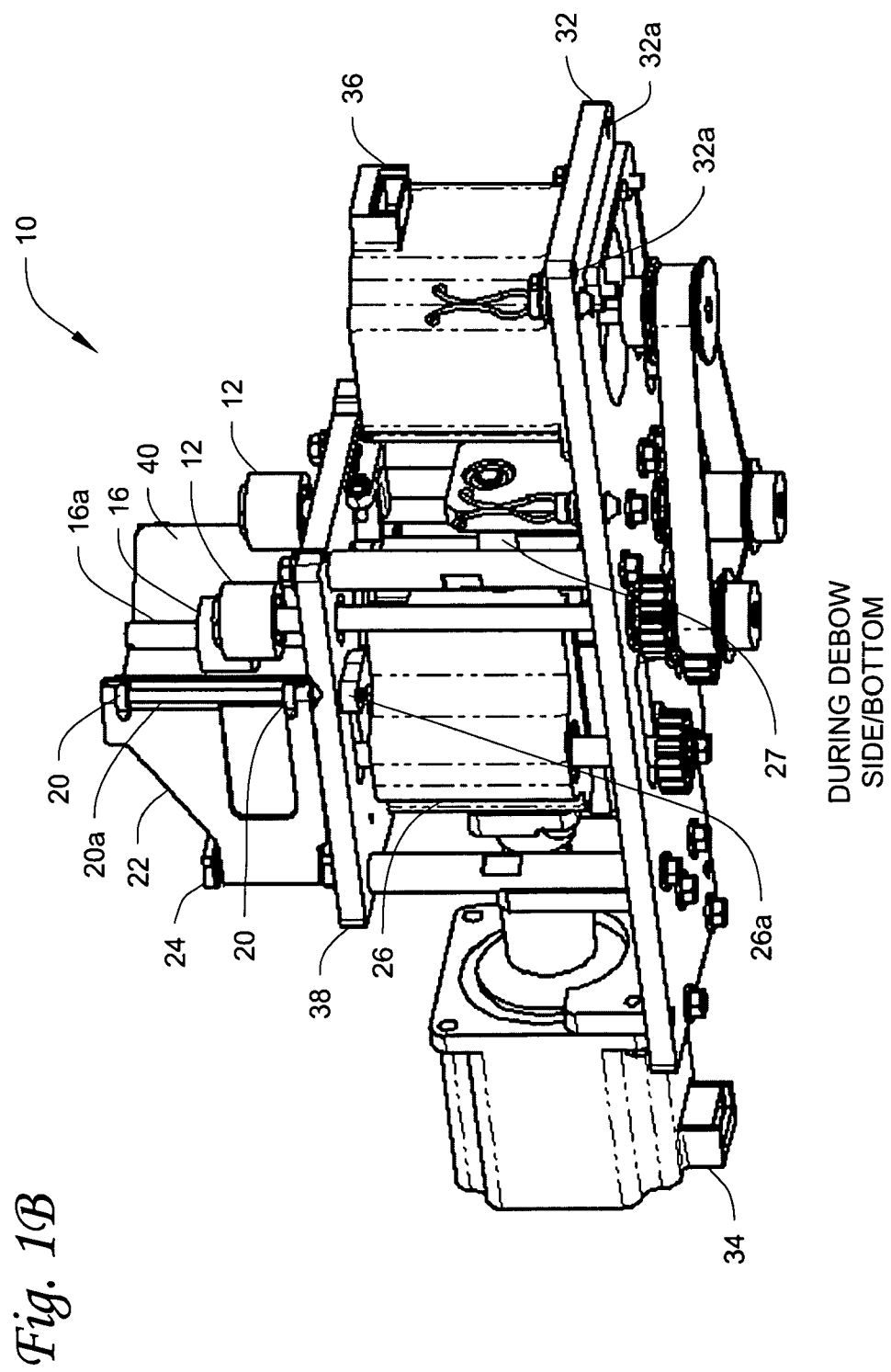
FIG. 1B represents a perspective side and partial bottom view of the apparatus for de-bowing personalized cards shown in FIG. 1A.

FIGS. 1A and 1B represent one embodiment of an apparatus 10 for de-bowing personalized cards. The apparatus 10 includes a frame that may have a first support frame 32 and a second support frame 38. As one example only, the first support frame 32 may be a planar member that supports the second support frame 38 as a planar stand thereon. The first support frame 32 supports a transfer mechanism connected to a first contact member 16 for moving the first contact member 16 between a contact position and a non-contact position. A shaft 16a may connect the first contact member 16 to the transfer carriage 26. Movement of the first contact member 16 will be further described below.

Turning to the transfer mechanism, a transfer carriage 26 may be movable along a linear slide. As one exemplary embodiment, a linear screw 27 is inserted through the transfer carriage 26, so that the transfer carriage can move along the linear slide. The transfer carriage 26 may be moved along the linear slide by any suitable means known in the art. As one example, the transfer carriage 26 may be moved through electrical power and control. As shown in FIGS. 1A and 1B, the transfer carriage 26 may be operatively connected with a power input or motor 34 and the linear screw 27. The first support frame 32 supports the power input or motor 34 on a surface thereon. The first support frame 32 may include a plurality of bolt holes 32a for attaching the apparatus to a card processing system (not shown).

It will be appreciated that the transfer mechanism including the transfer carriage 26 and linear screw 27 and linear slide are exemplary only, as there may be other equally or more suitable designs. Preferably, the transfer mechanism should be construed broadly as simply requiring any means for connecting to the first contact member 16 and for moving the first contact member 16 between the contact position and the non-contact position as described hereinafter.

The second support frame 38 supports transfer of a personalized card 40 into the apparatus 10 for de-bowing, and out of the apparatus 10 after de-bowing. A personalized card 40 can enter and exit the apparatus along a card path 42 (best shown in FIGS. 2A-2E below). The second support frame 38 includes an opening 17 extending in a direction from one end to the other end. As one example only, the opening 17 may be a slot where the shaft 16a can extend upwardly through the opening 17. The shaft 16a is movable within the direction of the slot. The shaft 16a includes the first contact member 16 disposed on the shaft 16a at a portion that extends upward through the opening 17.

As shown in FIG. 1A, the opening 17 may be a slot disposed along a center area of the second support frame 38. The first contact member 16 is positioned on the shaft 16a, such that the first contact member 16 can contact a generally horizontally and vertically centered area on one side of the personalized card 40, once a personalized card 40 has entered the apparatus 10 for processing. The first contact member 16 contacts the personalized card 40 when the shaft 16a moves the first contact member 16 along the opening 17 toward the card 40. Movement may be imparted from the transfer carriage 26 through the shaft 16*a* to the first contact member 16, as described above.

As one example only, the first contact member 16 may be a single contact pad movable along the opening 17. The first contact member 16 may be a roller constructed of a rubber material. When the first contact member 16 moves toward the personalized card 40, the first contact member 16 initiates contact with and initiates displacement of the personalized card 40 at a generally horizontally and vertically centered area. Preferably, the first contact member 16 initiates contact with and displacement of the personalized card 40 on a single point of the card 40 that is horizontally and vertically centered. Preferably, the first contact member 16 moves along a continuous axis in the same direction as the opening 17. The first contact member 16 moves between a contact position (card contacted and displaced) and a non-contact position (card not contacted and card not displaced). The contact and non-contact positions will be further described below in FIGS. 2A-2E.

In one embodiment, the first contact member 16 includes an outer arcuate surface 16*b* for contacting the personalized card 40. The outer arcuate surface 16*b* provides a surface so that the personalized card 40 may contour the outer arcuate surface when the first contact member 16 contacts the personalized card. In this manner, when the first contact member contacts and displaces the personalized card 40 against a bow occurring therein, a more uniform reverse bending may be achieved.

Generally, the second support frame 38 also supports one or more second contact members. In one embodiment, the one or more second contact members reside outside of a path of the first contact member 16. That is, the one or more second contact members reside outside of the opening 17 defined above. The one or more second contact members may be configured and arranged as a free rotating bearing made of steel or plastic. Preferably, the one or more second contact members are arranged and configured to contact the personalized card 40 when the first contact member moves toward the one or more second contact members and displaces the personalized card 40. The one or more second contact members contact a side opposite the side that the first contact member 16 contacts and at a position that is not generally a horizontal and vertical center area of the personalized card 40. Preferably, the one or more second contact members contact the personalized card 40 at a plurality of positions proximate the perimeter of the personalized card 40.

As shown in FIG. 1A, the one or more second contact members 20 are arranged and configured at positions to generally receive and contact four corner positions of the personalized card 40. As one example only, the one or more second contact members include four contact members 20 arranged at corners which generally correspond to the corners of a personalized card 40. Preferably, the second contact members are arranged as opposing rollers that contact a side opposite the side the first contact member contacts. It will also be appreciated that the second contact members are preferably small in diameter in order to position the second contact members at or near the edges of the personalized card and thereby increase the surface area of the personalized card that may be de-bowed while maintaining contact with the personalized card 40.

When the first contact member 16 displaces the personalized card 40, such as at a single point of the card 40 that is horizontally and vertically centered, the second contact members 20 may produce a bend substantially about the entire surface area of the card. That is, the first contact member 16 focuses its contact and displacement substantially at the center of the personalized card 40, and the second contact members 20 hold the personalized card 40 proximate corners thereof against displacement of the card 40 by the first contact member 16.

In this manner, the first contact member and the second contact members cooperate to bend substantially the entire surface area of the personalized card against a bow occurring in the personalized card along its horizontal axis and vertical axis. Thus, a reverse bend against the bow may be achieved about the horizontal and vertical axes. As shown, the first contact member 16 is configured to move along an axis normal to the side of the personalized card. It will be appreciated that in other embodiments the first contact member 16 may not be moving along the opening 17 and may be configured to generally receive the personalized card 40, while the second contact members 20 are configured to move along an axis that is normal to a side of the personalized card so as to contact and displace the personalized card 40 against a bow occurring therein. It will be appreciated that the four second contact members 20 shown are merely exemplary. Other configurations for the second contact members may also be suitable, so as to achieve the opposing effect at the four corners of a personalized card.

In yet another embodiment, the second contact members 20 are pivotable toward the first contact member 16 when the first contact member 16 moves toward the second contact members 20. A pivot assembly may be employed for pivoting the second contact members 20 inward. The pivot assembly includes a pivot support 24 having a pivot axis 24a. The pivot axis 24a pivotably supports a pivot arm 22 at one end, where the pivot arm 22 includes a pivot shaft 20a disposed at the other end. The pivot axis 24*a* allows the pivot arm 22 to move inward during de-bowing (best shown in FIG. 2C). The second contact members 20 are disposed on the pivot shaft 20*a*.

As illustrated in FIG. 1A, the apparatus 10 includes two pivot assemblies with like parts as described, and are disposed outside of the opening 17 and path of the first contact member 16. The second contact members 20 are arranged on the respective pivot shafts 20*a*. The second contact members 20 are configured on the pivot shafts 20*a*, such that the second contact members 20 may hold the personalized card 40 proximate corners thereof, and against displacement imparted by the first contact member 16. The pivot shafts 20*a* may pivot within openings 20*b*. The openings 20*b* extend in a direction transverse the direction of the opening 17. To move the pivot arms 22, the pivot shaft 20*a* on each pivot assembly can be connected to the transfer carriage 26 by a link arm 26*a*. In this configuration, as the first contact member 16 moves toward the personalized card 40 and the second contact members 20, the second contact members 20 move inward by the pivot assemblies, so as to oppose the displacement of the card caused by the first contact member 16. In this manner, when the second contact members pivot inward, they may achieve an optimum position for their contact points with the card, such that substantially the entire surface area of the personalized card 40 may be de-bowed.

The pivot arms of the pivot assembly may be pivoted by any suitable means known in the art. As one example, the pivot arms may be pivoted through electrical power and control. The pivot assembly may be operatively connected with the power input 34, so as to enable the pivot assembly to be electrically controlled. In this manner, the pivot arms can be moved by carriage 26 through the linkage with link arm 26*a*.

It will be appreciated that the pivot assembly illustrated, including the pivot support 24, pivot axis 24*a*, pivot arm 22, and pivot shaft 20*a*, is merely exemplary, as there may be other equally or more suitable designs for achieving a pivot mechanism. Preferably, the pivot assembly should be construed broadly as simply requiring any means for pivoting the second contact members toward the first contact member to optimize the position at contact points with the card.

The transfer carriage 26 may support a backing pad 18 mounted on a shaft 18a. The backing pad 18 is disposed opposite the first contact member 16 and along the opening 17. The backing pad 18 is shown as being disposed on the opposite side of the personalized card 40 with respect to the first contact member 16. The backing pad 18 can help to prevent the personalized card from being dislodged from the apparatus during card transfer and de-bowing. When the first contact member 16 is moved toward the personalized card 40, the backing pad 18 can move away from the personalized card 40. In this manner, the backing pad 18 provides clearance so as to allow the personalized card 40 to undergo reverse bending against a bow occurring therein (Shown in FIG. 2C-2D).

The second support frame 38 also includes transport rollers disposed thereon for receiving and exiting a personalized card. For viewing convenience, transport rollers are not shown in FIG. 1A, but are shown in FIGS. 2A-2E described hereinafter. The motor 36 may be provided so as to drive the transparent rollers (see FIGS. 1A-1B).

Figure 2A:
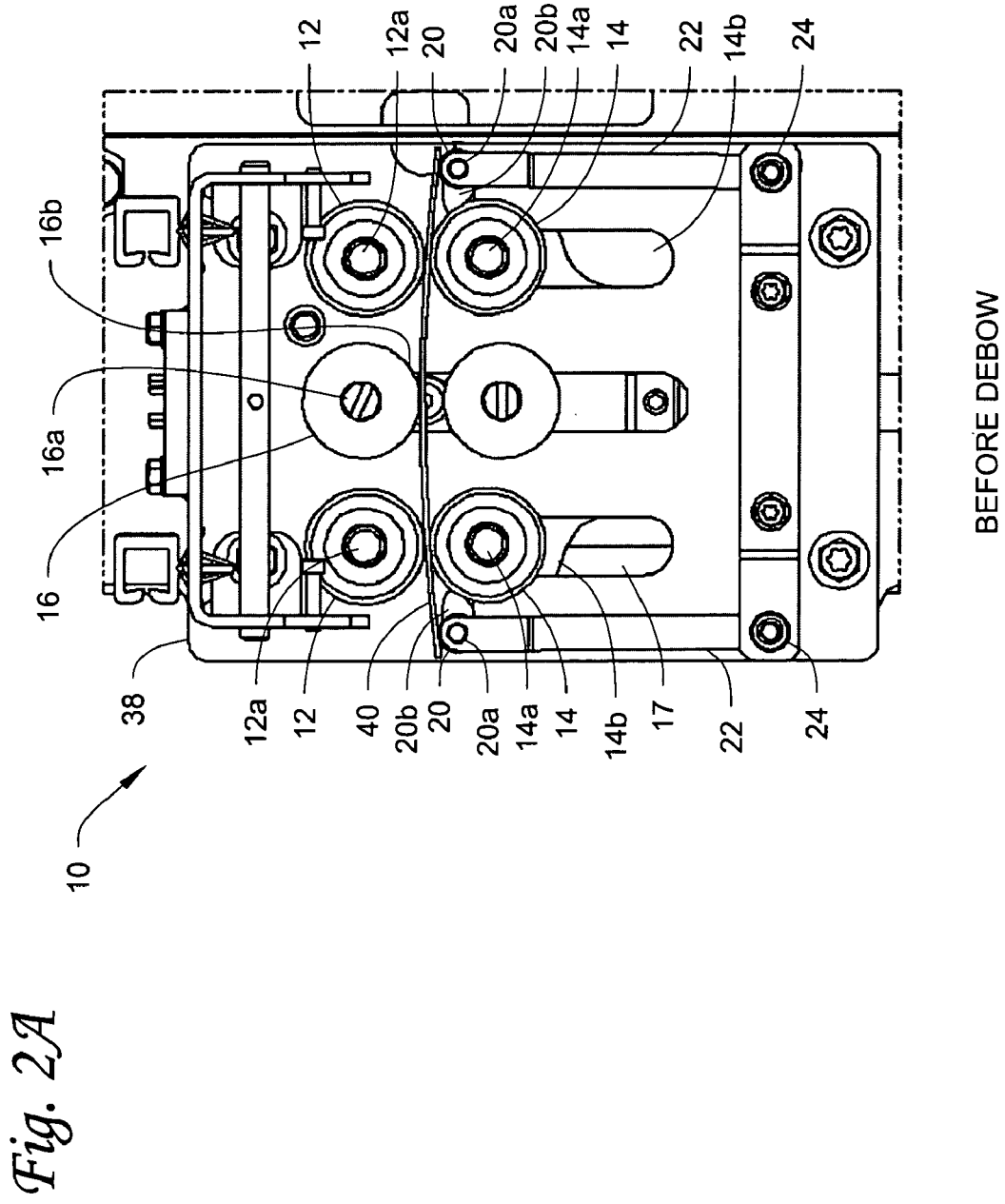
FIG. 2A represents a partial top view of the apparatus for de-bowing personalized cards showing the apparatus in a stage before de-bowing.
Figure 2B:
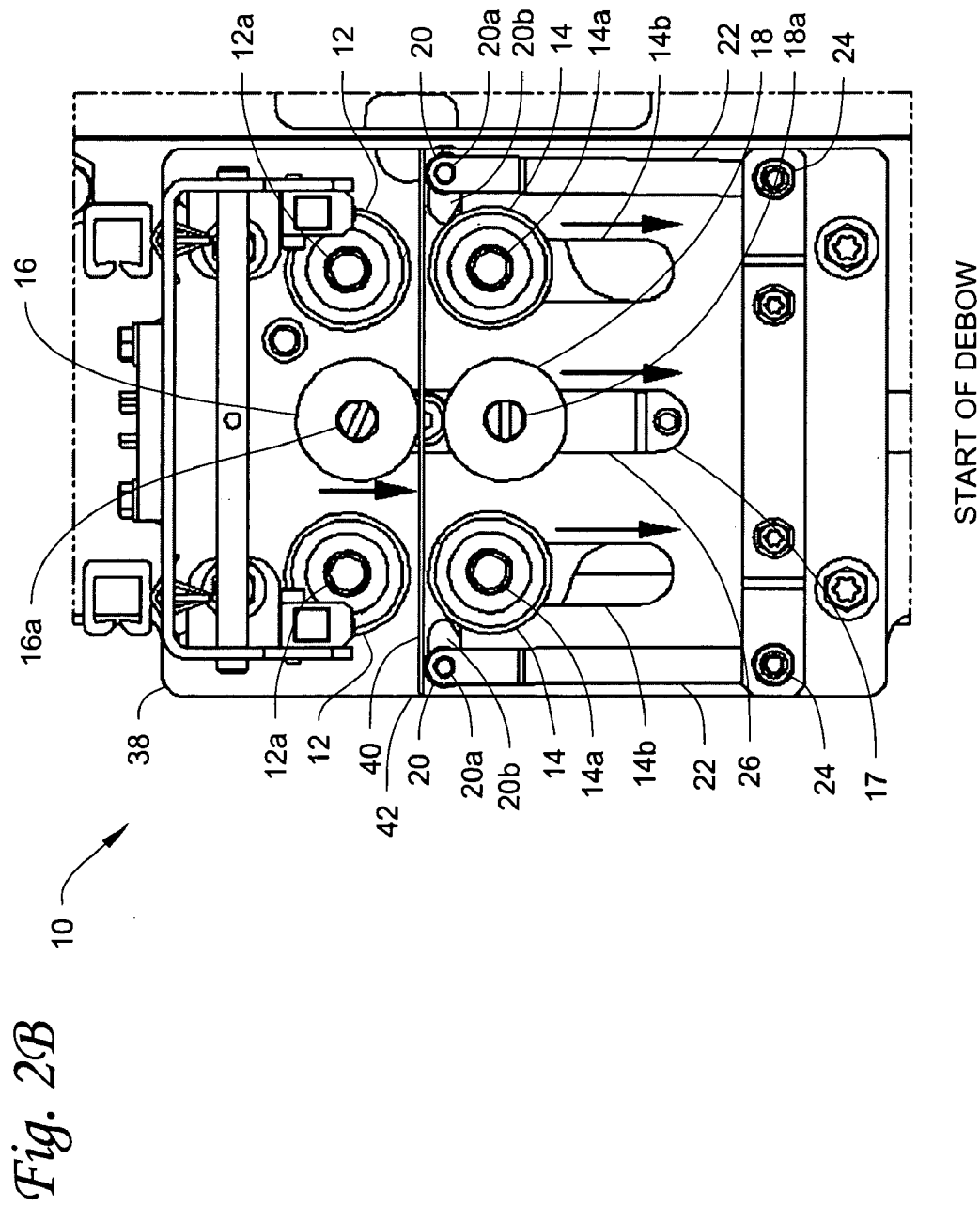
FIG. 2B represents a partial top view of the apparatus for de-bowing personalized cards showing the apparatus in a stage at the start of de-bowing.

FIGS. 2A-2E illustrate the apparatus 10 in operation. FIG. 2A represents a partial top view of the apparatus 10 in a stage before de-bowing. FIG. 2A shows first transfer rollers 12 and second transfer rollers 14. The first transfer rollers 12 may be mounted on the second support frame 38 on shafts 12a. The second transfer rollers 14 may be mounted on the transfer carriage 26 through the shafts 14a. Preferably, the second transfer rollers 14 are movable with the transfer carriage 26. The second transfer rollers 14 may be movable within openings 14b in the second support frame 38. The openings 14b reside outside of and extend in the same direction as opening 17 for the first contact member 16.

Figure 2C:
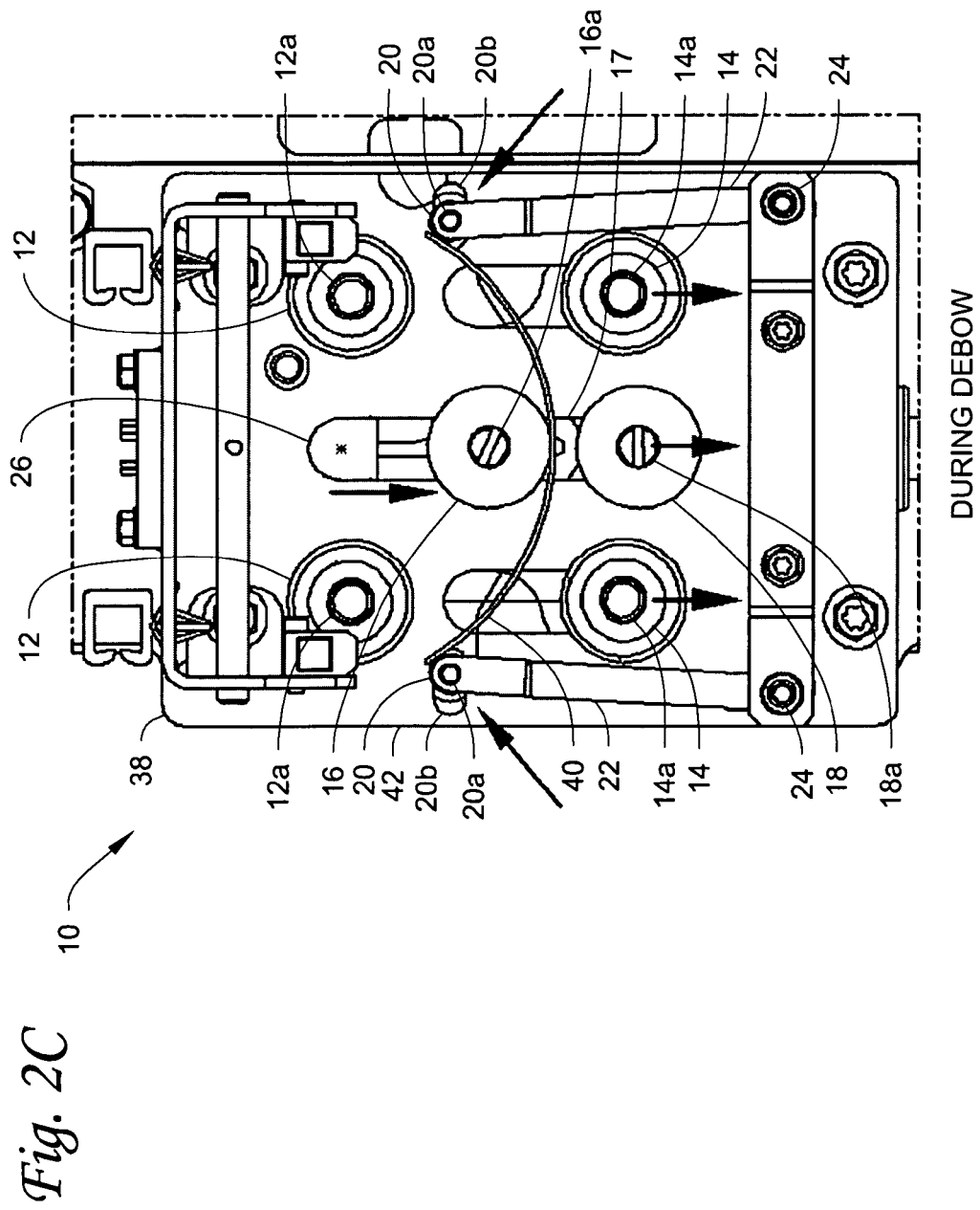
FIG. 2C represents a partial top view of the apparatus for de-bowing personalized cards showing the apparatus in a stage during de-bowing, and particularly showing a horizontal de-bowing state.
Figure 2D:
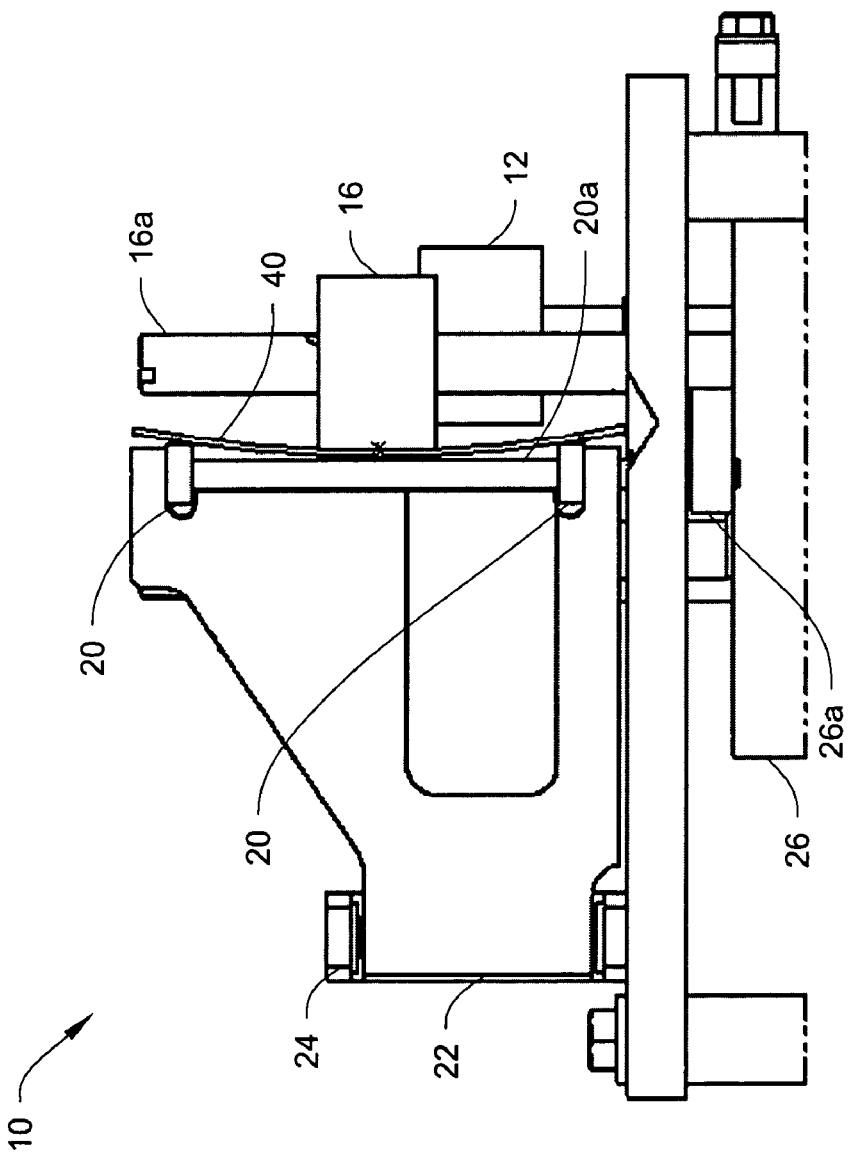
FIG. 2D represents a side view of the apparatus for de-bowing personalized cards showing the apparatus in a stage during de-bowing, and particularly showing a vertical de-bowing state.

FIGS. 2B-2E illustrate the apparatus 10 at the start of de-bowing and during de-bowing. When the transfer carriage 26 moves the first contact member 16 toward the personalized card 40 in the contact position, the second transfer rollers 14 moves away from the personalized card 40. In this manner, movement of the second transfer rollers 14 allow clearance for the card 40 to undergo reverse bending against a bow occurring therein. FIG. 2C illustrates the second contact members 20 pivoting inward toward the first contact member 16 along the openings 20b, as described above. In the contact position, the first contact member 16 displaces the personalized card 40 during de-bowing of the card 40. FIG. 2C represents the apparatus 10 in a stage during de-bowing, and particularly showing a horizontal de-bowing state. FIG. 2D represents the apparatus 10 in a stage during de-bowing, and particularly showing a vertical de-bowing state. It will be appreciated that both de-bowing states can occur simultaneously during the de-bowing stage. In this manner, the personalized card 40 can be de-bowed along its vertical and horizontal axis, such that substantially the entire surface area of the personalized card 40 may be de-bowed.

Figure 2E:
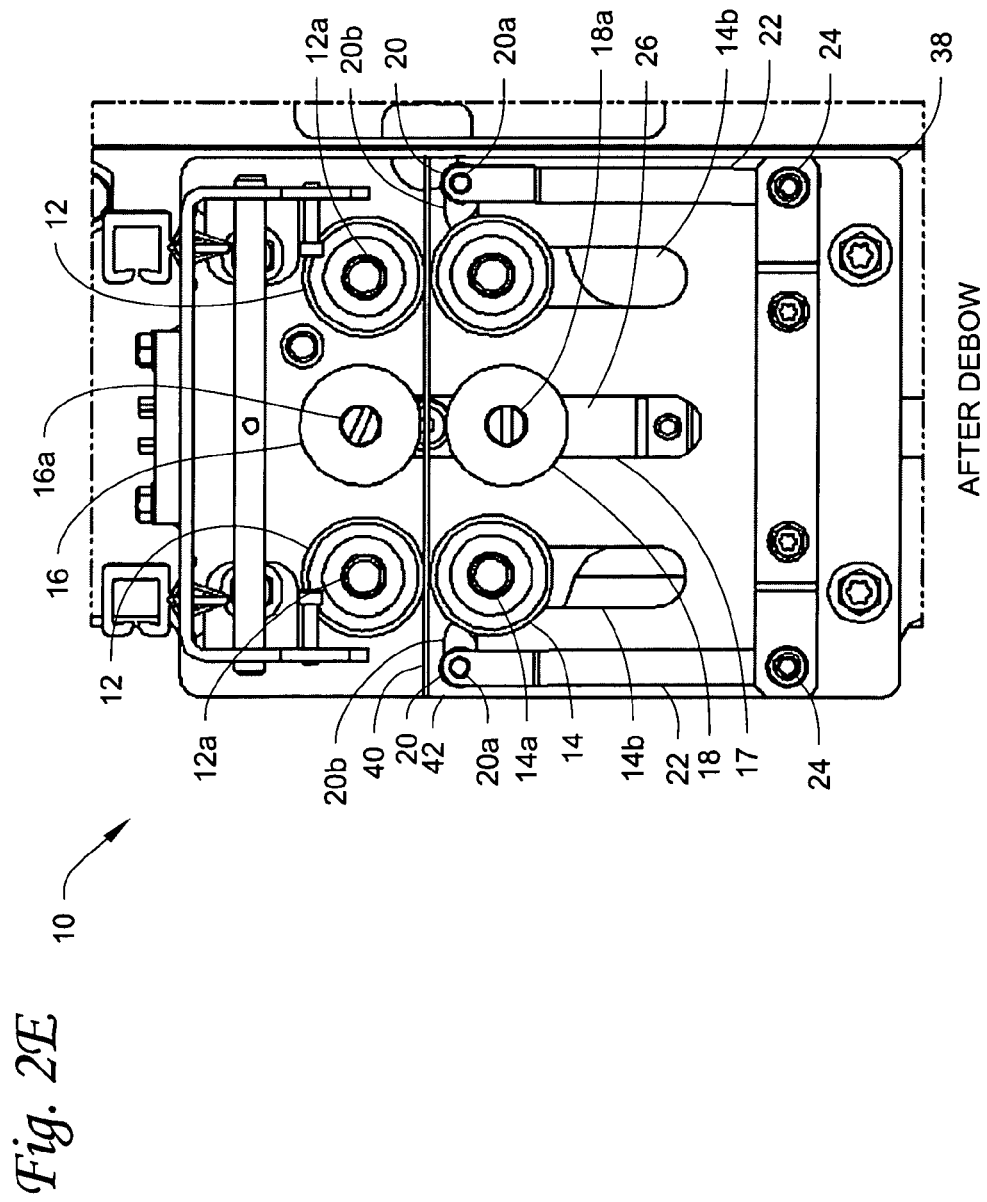
FIG. 2E represents a partial top view of the apparatus for de-bowing personalized cards showing the apparatus in a stage after de-bowing.

The amount of displacement and time the personalized card 40 may be subjected are about 1.0 inches (about 25.4 mm) for about 1.5 seconds. This amount, however, is merely exemplary as other displacement amounts and de-bow times may be equally or more suitable and may be modified according to the amount of bowing occurring in a card. FIG. 2E shows the apparatus 10 after de-bowing, where the personalized card has been de-bowed and the first contact member is in the non-displaced position. It will also be appreciated that in some embodiments de-bowing occurs immediately after lamination or heating of a personalized card. This configuration allows effective de-bowing of the heated personalized card while decreasing the amount of displacement required when the first and second contact members contact the personalized card. The apparatus 10 may also include the use of heating and or cooling operations on the personalized card 40 prior to de-bowing to facilitate treatment and effective de-bowing of the personalized card 40.

Turning back to the transfer rollers 12, 14, these rollers can allow for a personalized card to enter and exit the apparatus 10. As shown, one of the first transfer rollers 12 and one of the second transfer rollers 14 may constitute entry rollers. The other one of the first transfer rollers 12 and the other one of the second transfer rollers 14 may then constitute exit rollers.

The apparatus 10 may provide advantages such that a bowing effect of a personalized card may be reduced or entirely removed. Particularly, the apparatus may reduce a bowing effect of a personalized card after the personalized card is subjected to a heat lamination or other heat transfer processes.

With regard to the foregoing description, it is to be understood that changes may be made in detail, especially in matters of the construction materials employed and the shape, size, and arrangement of the parts without departing from the scope of the present invention. It is intended that the specification and depicted embodiment be considered exemplary only, with a true scope and spirit of the invention being indicated by the broad meaning of the following claims.

The invention claimed is:

1. An apparatus for de-bowing a personalized document, the apparatus comprising:
   a first contact member configured to contact the personalized document at a position that generally corresponds with a center of one side of the personalized document;
   a second contact member configured to contact the personalized document at a plurality of locations that are not generally horizontally and vertically centered on the personalized document,
   at least one of the first contact member or the second contact member is movable towards the other of the first contact member or the second contact member,
   the first contact member and the second contact member cooperate to displace the personalized document, where displacement occurs over substantially an entire surface area of the personalized document in both a generally vertical and horizontal direction to remove a bow occurring in the personalized document.

2. The apparatus of claim 1, wherein the first contact member comprises a single pad that is movable between a contact position and a non-contact position.

3. The apparatus of claim 1, further comprising a backing pad positioned generally opposite the first contact member on the opposite side of the personalized document.

4. The apparatus of claim 1, wherein the first contact member is configured to be movable toward the personalized document to initiate contact with and displacement of the personalized document at a generally horizontal and vertical center area of the personalized document.

5. The apparatus of claim 1, wherein the first contact member is configured to initiate contact with and displacement of the personalized document at a single horizontal and vertical center point of the document.

6. The apparatus of claim 1, wherein the second contact member is configured to contact the personalized document at a plurality of positions proximate the perimeter of the personalized document.

7. The apparatus of claim 2, wherein the second contact member is positioned outside of a path of the movable first contact member.

8. The apparatus of claim 1, wherein the second contact member is generally configured to contact four corner positions of the personalized document.

9. The apparatus of claim 8, wherein the second contact member comprises four contact members configured to contact the personalized document generally at four corner positions of the personalized document.

10. The apparatus of claim 1, wherein the second contact member is pivotable toward the first contact member when the first contact member moves toward the second contact member.

11. A system for processing personalized documents, the system comprising:
   an apparatus for de-bowing substantially the entire surface areas of personalized documents along both a horizontal and a vertical axis comprising:
      a first contact member configured to contact a personalized document at a position that generally corresponds with a center of one side of the personalized document;
      a second contact member configured to contact the personalized document at a plurality of locations that are not generally horizontally and vertically centered on the personalized document,
      at least one of the first contact member or the second contact member is movable towards the other of the first contact member or the second contact member,
      the first contact member and the second contact members cooperate to displace the personalized document, where displacement occurs over substantially an entire surface area of the personalized document in both a generally vertical and horizontal direction to remove a bow occurring in the personalized document.

12. The system of claim 11, wherein the first contact member of the apparatus for de-bowing comprises a single pad that is movable between a contact position and a non-contact position.

13. The system of claim 11, wherein the first contact member of the apparatus for de-bowing is configured to be movable toward the personalized document to initiate contact with and displacement of the personalized document at a generally horizontal and vertical center area of the personalized document.

14. The system of claim 11, wherein the second contact member is configured to contact the personalized document at a plurality of positions proximate the perimeter of the personalized document.

15. The system of claim 11, wherein the second contact member of the apparatus for de-bowing is positioned outside of the path of the movable first contact member.

16. The system of claim 11, wherein the second contact member comprise four second contact members configured to contact the personalized document generally at four corner positions of the personalized document.

17. The system of claim 11, wherein the second contact member is pivotable toward the first contact member when the first contact member moves toward the second contact member.

18. A method for de-bowing substantially the entire surface areas of personalized documents, the method comprising:
   providing a de-bowing apparatus having a frame supporting a first contact member and a second contact member;
   configuring the first contact member such that the first contact member is movable towards a personalized document and contacts one side of the personalized document at a generally horizontally and vertically centered area;
   configuring the second contact member to contact a portion of the personalized document at an area that is not generally horizontally and vertically centered and on an opposite side of the personalized document than the side which the first contact member contacts;
   displacing the generally horizontally and vertically centered area portion of the personalized document against a bow occurring therein as the first contact member initiates contact with the one side of the personalized document while the second contact members initiates contact with the opposite side of the personalized document.

19. The method of claim 18, further comprising de-bowing the entire surface area of the personalized document along both a vertical and horizontal axis of the personalized document.

20. The method of claim 18, further comprising configuring four second contact members of the plurality of second contact members to initiate contact at generally four corner positions of the opposite side of the personalized document.

\* \* \* \* \*